United States Patent [19]
Hu

[11] Patent Number: 5,280,690
[45] Date of Patent: Jan. 25, 1994

[54] WALL STONE PLATE FIXING ATTACHMENT

[76] Inventor: Edmund Hu, No.15, Tayu 2nd St., Taliao Hsiang, Kaohsiung Hsien, Taiwan

[21] Appl. No.: 29,576

[22] Filed: Mar. 11, 1993

[51] Int. Cl.⁵ .............................................. E04B 1/38
[52] U.S. Cl. ........................... 52/513; 52/508; 52/511; 52/512
[58] Field of Search ............ 52/508, 509, 511, 513, 52/512, 235, 479

[56] References Cited

U.S. PATENT DOCUMENTS

| | | | |
|---|---|---|---|
| 2,201,129 | 5/1940 | Weiland | 52/509 |
| 3,037,596 | 6/1962 | Fordyce | 52/511 |
| 3,349,530 | 10/1967 | Zigler | 52/512 |
| 3,478,480 | 11/1969 | Swenson | 52/235 |
| 3,715,950 | 2/1973 | Chambers | 52/235 |
| 3,990,199 | 11/1976 | Gallo | 52/235 |
| 4,021,989 | 5/1977 | Hala | 52/235 |
| 4,040,222 | 8/1977 | Cull | 52/508 |
| 5,138,809 | 8/1992 | Saikachi | 52/235 |

Primary Examiner—Michael Safavi
Attorney, Agent, or Firm—Larson and Taylor

[57] ABSTRACT

A wall stone plate fixing attachment for fixing stone plates securely on a wall, comprising a position base fixed on a wall surface, a position head of a preferably hexagonal shape having a female-thread to engage a male-thread of the position base and an outer end surface bored with position holes, and a securing nail having a vertical wall to fit in a groove of a stone plate and a post with a distal portion and an intermediate small-diameter portion cut with a central slot so that the distal end can recover its original condition after compressed to pass through the holes in the position head to secure the securing nail with the position head so as to secure the stone plate with the securing nail.

3 Claims, 5 Drawing Sheets

WALL STONE PLATE FIXING ATTACHMENT

BACKGROUND OF THE INVENTION

Common stone plates for adorning a wall are 3 cm. thick, and secured on the surface of a wall by means of a wet process using mixture of mortar and seaweed powder. This method takes time and has a problem of insufficient binding force to keep stone plates in place.

Another method, a dry process shown in FIG. 7 utilizes bolts and hooks in securing stone plates, but between stone plates and a wall surface should have to reserve a cavity space with thickness of more than 10 cm, for mounting bolts. Consequently, this method necessitates a wall to be made thicker than an ordinary size, forcing a room space reduced a little, and a small room is not suitable for using such stone plates, but has to use plywood printed with stone grain design instead. An U.S. patent application Ser. No. 07/753,087 titled "Adorning Stone Plate" is known, wherein stone plates are adhered together with support plates of plates of aluminum, and the support plates are fixed on a wall by means of bolts, bolt holes and notches.

SUMMARY OF THE INVENTION

This invention has been devised to offer a kind of wall stone plate fixing attachment for fixing stone plates securely on a wall, and outer surfaces of all stone plates on wall can be adjusted to be on a same flat level.

The wall stone plate fixing attachment in the present invention comprises a position base, a position head and a securing nail. The position base is fixed on a wall surface, having a male-thread to engage a female-thread of a position head, which has an outer flat end surface, and a plurality of small holes in the outer flat end surface for a corn-shaped distal end of a securing nail to fit through to secure the securing nail. The scruing nail has a vertical wall shaped as a quarter of a circle, which is inserted in a groove of the same shape as the vertical wall of the stone plate so that the stone plate is kept secured by the securing nail.

DETAILED DESCRIPTION OF THE INVENTION

Figure 1:
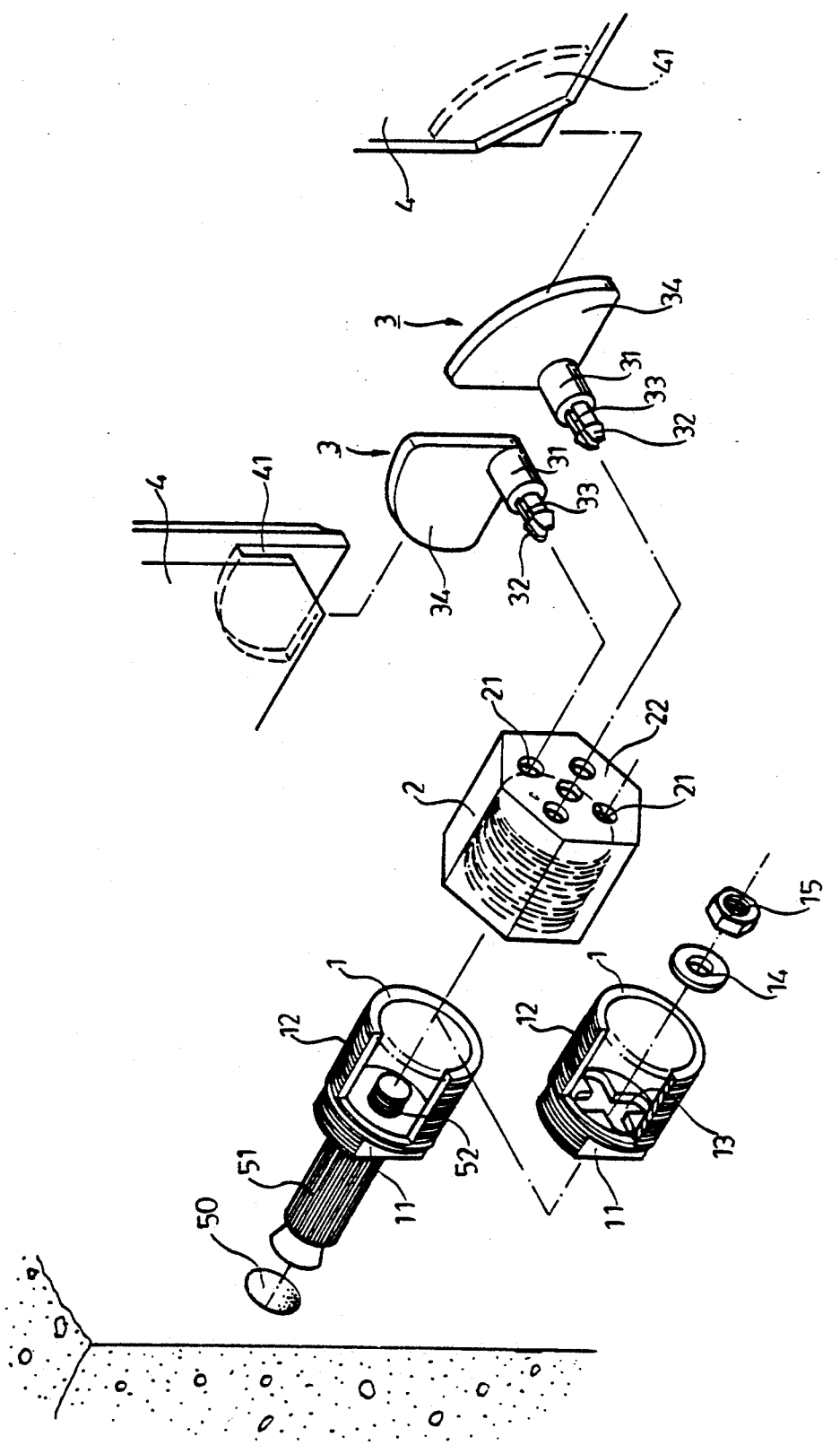
FIG. 1 is an exploded perspective view of a first embodiment of a wall stone plate fixing attachment in the present invention.

A first embodiment of an wall stone plate fixing attachment in the present invention, as shown in FIG. 1, comprises a position base 1, a position head 2, a securing nail 3, as its main components.

The position base 1 is cylindrical and to be fixed firmly on a wall, having a central lengthwise threaded hole in an inner end surface for a threaded portion 52 of a wall expansion bolt 51 fixed in a wall hole 50 to engage with, a non-curved face 11 on the inner end portion for a wrench to pinch in rotating this circular base 1, or a cross-shaped hole 13 in a bottom wall for the threaded portion 52 to extend through and to be fixed with a washer 14 and a nut 15 by a wrench, and a circular male-threaded portion 12 to engage a female-threaded hole in the position head 2.

The position head 2 is shaped preferably hexagonal, having a female-threaded hole to engage the circular position base 1, and an outer end surface 22 bored with a plurality of position holes 21 for a cone-shaped distal portion 32 of a post 31 of a securing nail 3 to fit therein. And the level of the outer end surface 22 of the position head 2 can be adjusted by rotating the female-thread in relation to the male-thread of the position base 1.

The securing nail 3 has a vertical flat wall 34 shaped as a quarter of a circle with a vertical straight side and a horizontal straight side, and a post 31 with a corn-shaped distal portion 32 and an intermediate smaller-diameter portion abutting the distal portion 32 and a proximal larger-diameter portion. The post 31 extends horizontally from the corner of the vertical straight side and the horizontal straight side of the vertical flat wall 34 such that more than two securing nails 3 can be combined with one position head 2, having a central slot 33 in the distal portion 32 and the intermediate smaller-diameter portion, and the corn-shaped distal portion can easily pass through one of the position holes 21 of the position head 2 in a compressed condition and recover its original position after passing through the hole 21, with the intermediate small-diameter portion engaging the hole 21 as to secure the securing nail 3 with the position head 2.

Figure 6:
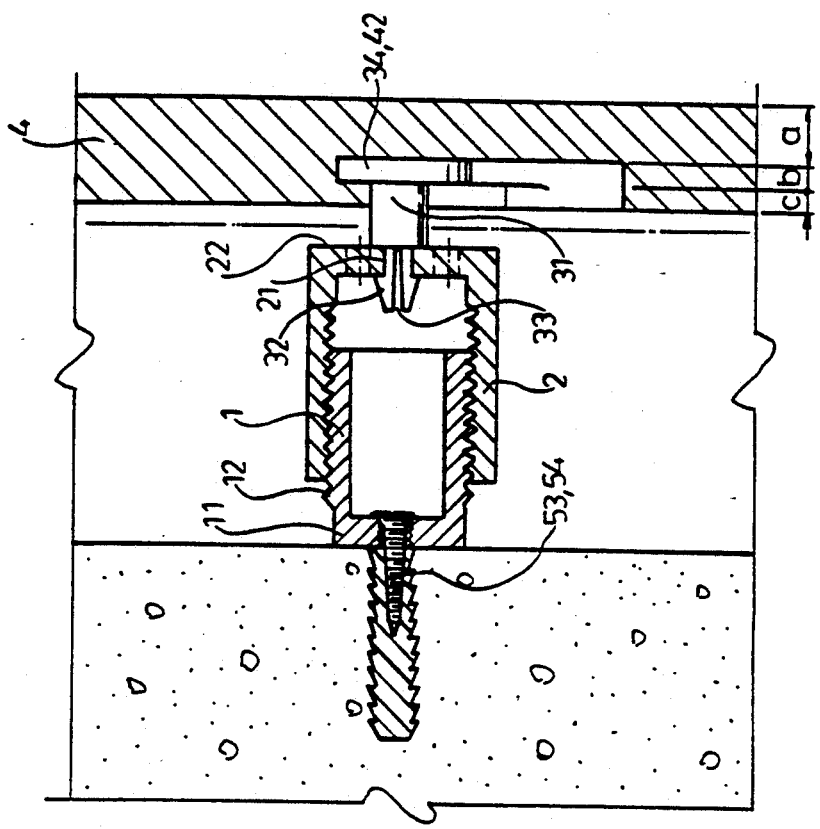
FIG. 6 is a cross-sectional view of line 6—6 in FIG. 5.
Figure 5:
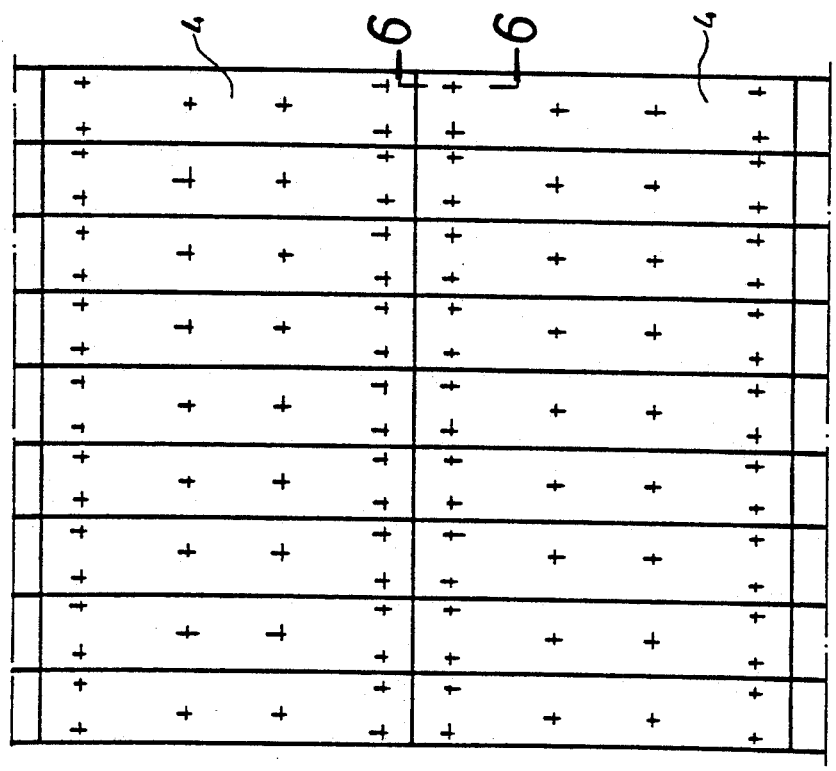
FIG. 5 is a front view of the second embodiment of the wall stone plate fixing attachment in the present invention.
Figure 7:
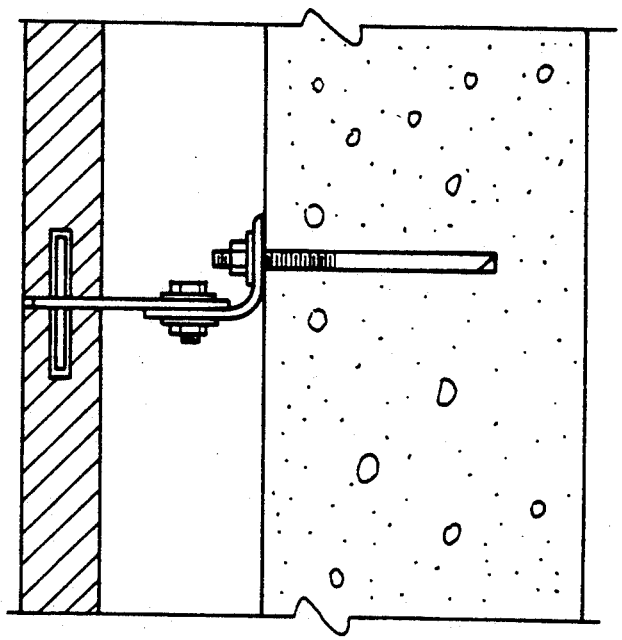
FIG. 7 is a cross-sectional view of a conventional wall stone plate fixing attachment.

The wall stone plate 4 is made of marble, granite, etc. for adornment, having an inserting groove 41 in every corner for the vertical portion 34 of the securing nail 31 to fit therein. And as shown in FIGS. 3 and 6, the wall stone plate 4 has a certain thickness (a) between its outer surface and a right side surface of the groove 41, a thickness (b) of the groove 41 being almost equal to the thickness of the vertical flat portion 34 and a rest thickness (c) between an bottom surface of the plate 4 and the left side surface of the groove 41 being shorter than the length of a larger-diameter portion of the post 31 so that the wall stone plate 4 may be flat after mounted on a wall.

Figure 3:
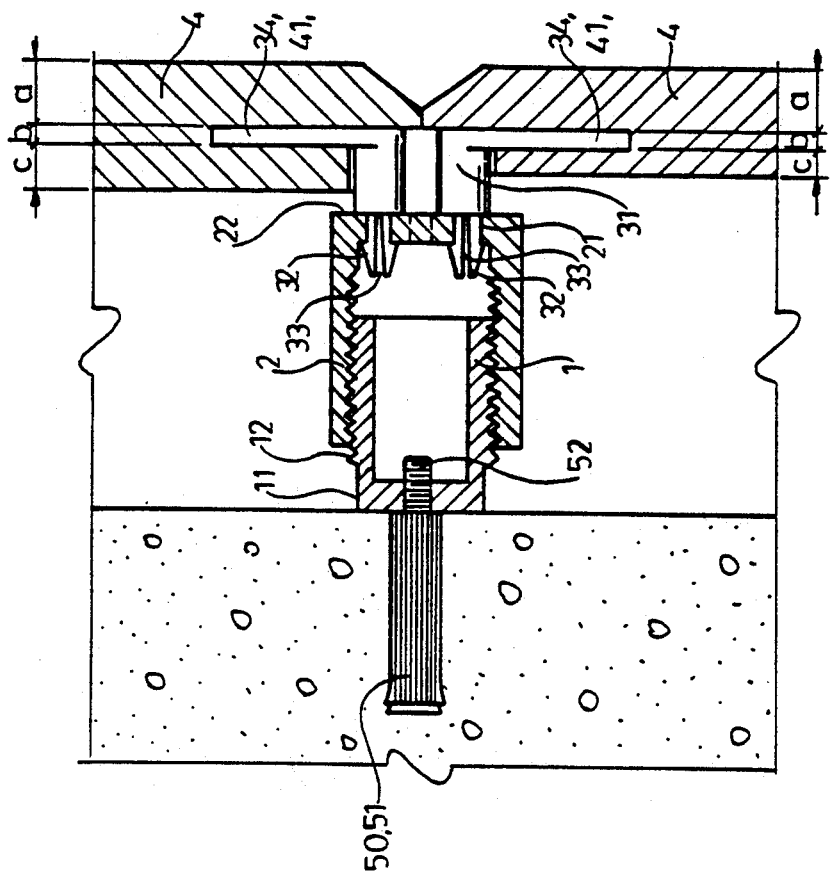
FIG. 3 is a cross-sectional view of line 3—3 in FIG. 2.
Figure 2:
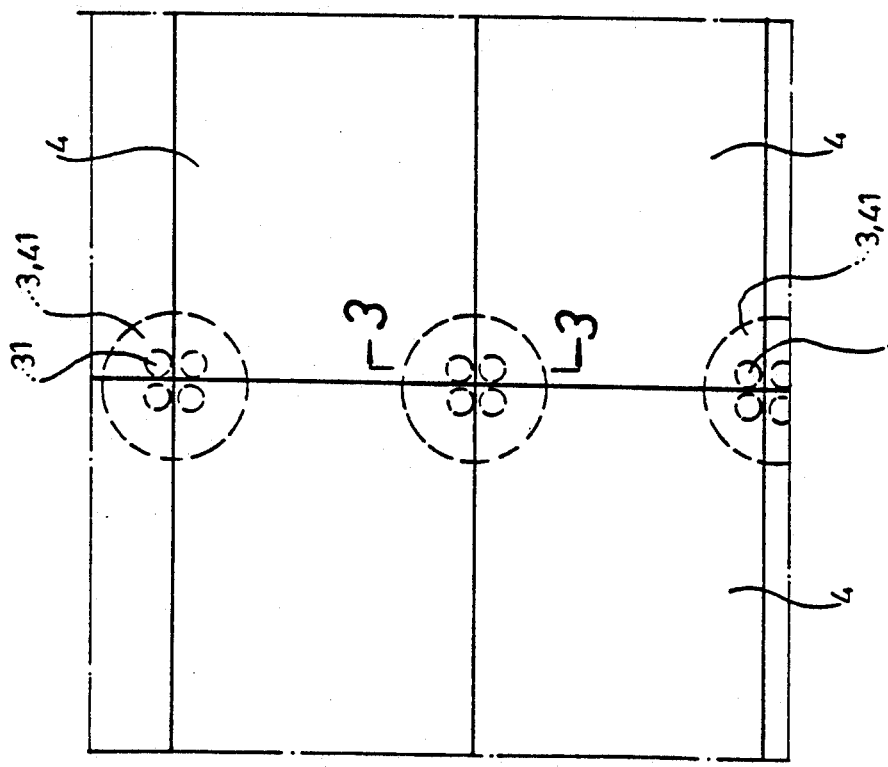
FIG. 2 is a front view of the first embodiment of the wall stone plate fixing attachment in the present invention.

When wall plate 4 are to be mounted on a wall, as shown in FIGS. 2 and 3, first a templet as large as the wall stone plate 4 is prepared and placed on the wall, having a hole corresponding to the bolt hole 50 in the wall for fixing the position base 1. Then a hole mark of the hole 50 is drawn on the wall according to the hole cut in the templet and bored as marked. After that, a wall expansion bolt 51 is fixed in the bored bolt hole 50 and the position base 1 is screwed with the bolt 51 tightly and securely. If the wall hole 50 is not accurately located, another position base 13 shown in in FIG. 1 instead of the position base 1 can be used, having a cross-shaped hole in a bottom wall, and the cross-shaped hole 13 can enable the position base 1 to be moved up and down or left or right to correspond to the wall hole 50. Then the position hand 2 is screwed with the position base 1 or 13, and the vertical flat wall 34 of the securing nail 3 is inserted in the groove 41 of the wall plate 4, with the cone-shaped distal portion 32 of the nail 3 accurately pushed inserting through the position hole 21 in the outer end surface 22 of the position head 2, securing the wall stone plate 4 with the position head 2.

In order to make all the wall plates mounted on a wall being on a same level, if the wall itself is not so flat and smooth, all of the position heads 2 can be rotated relative to the position base 1, adjusting their outer end surfaces at a same level as a horizontal standard line pulled above the wall. Then all the wall plates 4 can be conveniently combined with the securing nails 3, obtaining a flat smooth level. Even in case wall plates 4 have different thickness, they can be kept at a same flat level with the length of the proximal larger-diameter portion of the post 31 being longer than the thickness (c).

Figure 4:
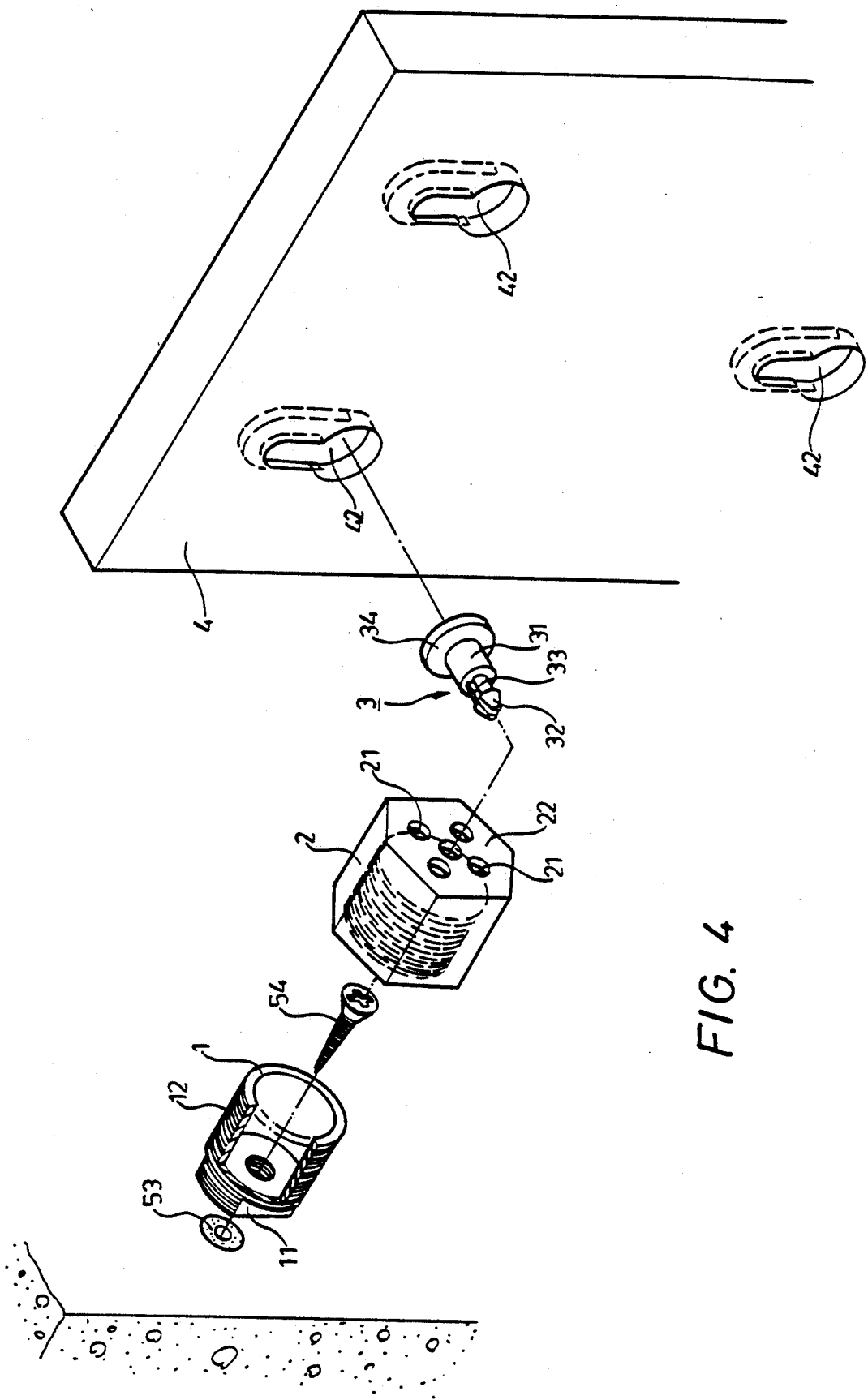
FIG. 4 is an exploded perspective view of a second embodiment of the wall stone plate fixing attachment in the present invention.

FIG. 4 shows a second embodiment of the wall stone plate fixing attachment, comprising a wall plate 4 of rather light material, a position base 1 being the same as that in the first embodiment, a position head 2 also being the same as that in the first embodiment, and a securing nail 3 having a post 31 the same as that in the first one but no vertical wall 34 of the first one but a larger-diameter flat head. A wall hole for fixing the position base 1 is plugged with a stopper 53 and a screw 54 fixed the position base 1 in the stopper 53. The wall stone plate 4 has inserting holes 42 for the nails 3 to fit therein. The second embodiment has the same function as the first one.

What is claimed is:

1. A wall stone plate fixing attachment comprising; a position base being fixed firmly on a wall, having a cylindrical shape, a male-threaded outer surface for a female-threaded lengthwise hole of a position head to engage with;

a position head of a hexagonal shape, having a female-threaded hole to engage with the position base, an outer end surface bored with a plurality of position holes for securing nails to fit therein;

a securing nail having a vertical wall of nearly a quarter of a circle with a vertical straight side and a horizontal straight side, a post having a distal cone-shaped portion and an intermediate smaller-diameter portion extending horizontally and rearward from a corner of the vertical and the horizontal side of the vertical wall, a proximal larger-diameter portion, a central slot cut in said distal portion and said intermediate smaller-diameter portion; and said vertical wall of the securing nail fitting in a groove of a wall stone plate, said cone-shaped distal portion of the securing nail being compressed diametrically and pushed through one of said position holes of the outer end surface of the position head and then stopped by a side wall of said position hole to keep the securing nail secured with the position head, each wall stone plate having an inserting groove in each corner, said inserting groove having the same shape as said vertical wall of the securing nail and a depth the same as the thickness of said vertical wall of the securing nail.

2. The wall stone plate fixing attachment as claimed in claim 1, wherein said position base has a non-round face on its outer surface, and a central threaded hole in an end surface of said position base contacting with said wall for the threaded portion of an expansion bolt to extend through.

3. The wall stone plate fixing attachment as claimed in claim 1, wherein said position base has a non-round face on its outer surface, and a cross-shaped hole in a bottom wall of said position base for the threaded portion of an expansion bolt to extend through.

* * * * *